United States Patent Office 3,503,980
Patented Mar. 31, 1970

3,503,980
TETRAHYDROAZACYCLOALKANO[1,2-a]
PYRIDAZINES
Alberto Rossi, Oberwil, Basel, Switzerland, assignor to
Ciba Corporation, New York, N.Y., a corporation of
Delaware
No Drawing. Filed Sept. 2, 1966, Ser. No. 576,834
Claims priority, application Switzerland, Oct. 4, 1965,
13,645/65; Aug. 19, 1966, 12,031/65
Int. Cl. C07d 57/22
U.S. Cl. 260—268        16 Claims

ABSTRACT OF THE DISCLOSURE

Tetrahydro-azacycloalkano[1,2-a]pyrazines comprising the ring skeleton of the formula

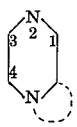

which contain in position 1 an oxo group, in position 3 a hydrogen atom and an aryl radical, and in position 4 hydrogen aryl, aryl-lower alkyl and/or lower alkyl radicals, and their salts. The compounds are useful as sedatives, antiepileptics and muscle relaxants.

---

The present invention relates to new tetrahydro-azacycloalkano[1,2-a]pyrazines. Especially it concerns tetrahydro-azacycloalkano[1,2-a]pyrazines comprising the ring skeleton of the formula

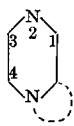

which contain in position 1 an oxo group, in position 3 a hydrogen atom and an aryl radical, and in position 4 hydrogen aryl, aryl-lower alkyl and/or lower alkyl radicals, and their salts.

The aryl radicals in positions 3 and 4 of the new compounds are above all mononuclear or binuclear aromatic residues, especially phenyl residues which may contain in any desired position one, two or several substituents, such as lower alkyl or lower alkoxy residues, preferably such as contain at most 4 carbon atoms, such as ethyl, ethoxy, propyl, propoxy, butyl, butoxy or above all methyl and methoxy groups, halogen atoms such as fluorine, chlorine, bromine or the pseudo-halogen trifluoromethyl, methylenedioxy, hydroxyl, nitro or amino groups, such as free or mono- or di-lower alkylated amino groups or acylamino groups, for example lower alkanoylamino groups, such as acetylamino or propionylamino groups or benzoylamino groups.

Lower alkyl radicals in position 4 are preferably likewise those which contain at most 4 carbon atoms, such as methyl, ethyl, propyl, isopropyl, butyl, secondary butyl or isobutyl, whereas in the aryl-lower alkyl radicals the aryl residues, especially those mentioned above, are linked primarily through an alkylene radical containing 1 to 3 carbon atoms, such as methylene, 1,2-ethylene, 1,3-, 1,2- or 2,3-propylene.

The new compounds may contain further substituents, for example on the cycloalkano part one or several lower alkyl groups, for example those mentioned above, especially methyl, or carbamoyl groups. Furthermore, the nitrogen atom in position 2 may likewise carry a substituent, above all a optionally substituted lower aliphatic hydrocarbon residue, especially one containing up to 4 carbon atoms, which may be substituted by hydroxyl groups or free or substituted amino groups and be, for example, a suitable alkyl, hydroxyalkyl, aminoalkyl or alkenyl radical such as methyl, hydroxymethyl, aminomethyl, ethyl, hydroxyethyl, aminoethyl or a corresponding propyl or butyl group, or an allyl or methallyl group, or a cycloalkyl group, for example cyclopentyl or cyclohexyl, or an aryl-lower alkyl radical, for example as indicated above, especially a benzyl, 1-phenylethyl or 2-phenylethyl residue.

Substituted amino groups are, for example, mono-substituted or in the first place di-substituted amino groups, suitable substituents being above all alkyl, alkenyl, alkylene, cycloalkyl, oxaalkylene or azaalkylene residues. As relevant examples there may be mentioned di-lower alkyl-amino groups, such as dimethylamino, diethylamino or dipropylamino groups, pyrrolidino, piperidino, morpholino, hexamethyleneamino, heptamethyleneamino, piperazino, N-methylpiperazino or N-hydroxyethylpiperazino groups.

The alkyl radical substituted by an amino group is especially a tertiary amino-methyl, amino-ethyl or aminopropyl residue.

The azacycloalkano ring of the new compound consists preferably of 5 to 7 cyclic members so that they are 1-oxo-3-aryl-octahydro-pyrrolo[1,2-a]pyrazines or 1-oxo-3 - aryl - tetrahydro - azacycloheptano[1,2-a]pyrazines or above all 1-oxo-3-aryl-octahydro-pyrido[1,2-a]pyrazines.

The new compounds possess valuable pharmacological properties. Inter alia, they combine an inhibitive effect on the polysynaptic reflex transmission with, especially, an anticonvulsive effect, as has been revealed in animal tests, for example on mice. The new compounds may therefore be used as sedatives, antiepileptics and as muscle relaxants.

The new compounds are also valuable intermediates for the manufacture of further pharmacologically useful substances.

An especially valuable anticonvulsive action is observed with the compounds of the formula

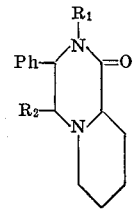

in which Ph represents an unsubstituted phenyl residue or a phenyl residue substituted by one, two or several lower alkyl or lower alkoxy groups and/or halogen atoms, for example as described in greater detail above, and $R_1$ and $R_2$ stand for lower alkyl radicals, for example as defined above, especially methyl, or above all for hydrogen.

Of special importance in this group is 1-oxo-3-phenyl-octahydro-pyrido[1,2-a]pyrazine which, for example in the form of its hydrochloride, on subcutaneous or oral administration to mice in doses from 30 to 60 mg. per kg. bodyweight produces a distinct antistrychnine, antinicotine, anticardiazole and antipicrotoxin effect, and when administered subcutaneously in a dose of 100 ml. per kg. bodyweight produces a distinct inhibition of the extensor spasm following upon electroshock.

The present invention is based on the observation that the new compounds are obtained by hydrogenation of the heterocyclic system in 1-oxo-3-aryl-tetrahydro-azacycloalkano[1,2-a]pyrazines that contain in position 4 hydrogen, aryl, aryl-lower alkyl and/or lower alkyl radicals and whose heterocyclic system contain a cyclic double bond starting from carbon atom 3, and, if desired, a resulting compound that is N-unsubstituted in position 2 is N-substituted.

The present invention is based on the observation that usual manner. A suitable reducing agent is, for example, catalytically activated hydrogen, such as hydrogen in the presence of a platinum, palladium or nickel catalyst, or nascent hydrogen, for example hydrogen produced by the action of an acid, such as acetic or perchloric acid, upon zinc.

A resulting compound that still contains a hydrogen atom in position 2 can be N-substituted in the usual manner, for example to manufacture compounds in which the substituent in position 2 contains no hetero atoms or in which any hetero atoms possibly present in the 2-substituent are separated by at least 2 carbon atoms from the ring nitrogen atom, by reaction with a reactive ester of an alcohol, especially one of the formula $R_3$—OH, where $R_3$ represents a lower aliphatic hydrocarbon residue, a cycloalkyl radical or an aryl-lower alkyl radical. Reactive esters in this connection are, those with strong inorganic acids or organic sulphonic acids, above all with hydrohalic acids, for example hydrochloric, hydrobromic or hydriodic acid, or sulphuric acid, or arylsulphonic or alkanesulphonic acids, above all with phenylsulphonic such as toluenesulphonic acids. In this connection it is advantageous to start from a metal salt, such as an alkali metal salt, of the tetrahydro-azacycloalkano[1,2-a]pyrazine, or the reaction is performed in the presence of a basic condensing agent, especially of one that is capable of forming metal salts, such as an amide or hydride, a hydrocarbon compound, a hydroxide, alcoholate or carbonate of an alkali metal.

Compounds in which the residue in position 2 is a methyl residue carrying a hydroxyl group or a free or substituted amino group, being especially a hydroxymethyl or secondary or tertiary aminomethyl residue, are obtained by reaction with formaldehyde, if desired or required in the presence of ammonia or of an amine.

The hydroxymethyl group is introduced by a simple reaction with formaldehyde, advantageously in the presence of a basic condensing agent, such as an alkali metal hydroxide or carbonate, or of a tertiary amine or quaternary ammonium hydroxide such as triethylamine or benzyl trimethylammonium hydroxide.

The aminomethyl group is advantageously introduced by the Mannich reaction, for example with formaldehyde with the use of a salt of ammonia or of the amine.

The aforementioned reactions are carried out in the usual manner, in the presence or absence of diluents, condensing agents and/or catalysts, at room temperature or with heating or cooling, under atmospheric or superatmospheric pressure and/or in an inert gas.

Furthermore, a resulting compound may be nitrated on the aryl radical in position 3. The nitration follows the usual practice and consists, for example, in a treatment with a mixture of concentrated sulphuric acid and concentrated nitric acid.

A resulting 3-(nitroaryl) compound can be reduced in the usual manner to a 3-(aminoaryl) compound, for example with catalytically activated hydrogen, such as hydrogen in the presence of a hydrogenating catalyst, for example a platinum, palladium or nickel catalyst, such as platinum oxide, palladium carbon or Raney nickel.

A resulting 3-(aminoaryl) compound can be acylated in the usual manner, for example lower alkanoylated or benzoylated. The acylation is performed, for example, by reaction with a halide, such as the chloride, or an anhydride of a carboxylic acid.

The reaction is performed in the usual manner, preferably in the presence of an acid acceptor, such as an organic or inorganic base.

Depending on the reaction conditions and starting materials used the final products are obtained in the free form or in the form of their salts which are likewise included in the present invention. The salts of the final products can be converted into the free bases in known manner, for example with alkalies or ion exchange resins. When the free bases are reacted with organic or inorganic acids, especially such as are suitable for forming physiologically tolerable salts, they yield salts. As such acids there may be mentioned, for example, hydrohalic acids, sulphuric acids phosphoric acids, nitric and perchloric acid; aliphatic, alicyclic, aromatic and heterocyclic carboxylic and sulphonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic, para-aminosalicylic, embonic, methanesulphonic, ethanesulphonic, hydroxyethanesulphonic, ethylenesulphonic acid; halogenbenzenesulphonic, toluenesulphonic, naphthalenesulphonic acids or suphanilic acid.

The salts mentioned above or other salts of the new compounds, for example their picrates, may also be used for purifying the free bases obtained by converting the latter into salts, isolating the salts and liberating the bases from the salts. In view of the close relationship between the new compounds in the free form and in the form of their salts what has been said above and below with reference to the free bases equally concerns the corresponding salts wherever this is possible and suitable.

The invention further includes any modification of the process in which an intermediate obtainable at any stage of the process is used as starting material and any remaining step or steps is/are carried out, or in which a reactant is used in the form of its salts.

Since they contain at least 2 asymmetric carbon atoms, the new final products may result in the form of racemate mixtures, pure racemates or optical antipodes.

On the strength of the physico-chemical differences between the constituents racemate mixtures can be resolved in the known manner into the stereoisomeric (diastereomeric) pure racemates, for example by chromatography and/or fractional crystallization.

Racemic final products can likewise be resolved into their optical antipodes by known methods, for example as follows: The racemic bases are dissolved in a suitable inert solvent, reacted with an optically active acid and the resulting salts are separated, for example by virtue of their different solubilities, into the diastereomers from which the antipodes of the new bases can be liberated by treatment with alkaline agents. Especially frequently used optically active acids are the D- and L-forms of tartaric acid, di-ortho-toluoyltartaric acid, malic acid, mandelic acid, camphorsulphonic acid or quinic acid. Optically active forms of the above-mentioned compounds are also accessible by biochemical methods. Alternatively the separation can be achieved, for example by recrystallization of the resulting pure racemate from an optically active solvent. It is of advantage to isolate the more active of the two antipodes.

For the reactions of this invention there are preferably used starting materials that give rise to the above-mentioned preferred compounds.

The tetrahydro-azacycloalkano[1,2-a]pyrazines used as starting materials, which contain in position 1 an oxo group, in position 3 an aryl radical, and in position 4 hydrogen, aryl, aryl-lower alkyl and/or lower alkyl radicals and which contain a cyclic double bond starting from carbon atom 3, are new and are likewise included in this invention. It has been observed that they are obtained by condensing in the usual manner a reactive ester of a 2-aryl-2-oxo-1-Y-1-Y'-ethanol (where X and Y' have the above meanings) with an azacycloalkane-2-carboxylic acid amide containing on the amide nitrogen atom at least one hydrogen atom, if desired in the presence of a basic condensing agent or of an excess of azacycloalkane-2-carboxylic acid amide and a possibly resulting 1-(2-aryl-2-oxo-1-Y-1-Y'-ethyl)-azacycloalkane-2-carboxylic acid amide is subjected to intramolecular cyclization, for example by treatment with an acid or a base and/or water is eliminated from a resulting 3-aryl-3-hydroxy-4-Y-4-Y'-tetrahydro - azacycloalkano[1,2-a]pyrazine, for example by treatment with an acid or a base.

Any other starting material that is new is obtained by known methods.

The new compounds may be used, for example, in the form of pharmaceutical preparations containing them in the free form or in the form of their physiologically tolerable salts in admixture or conjunction with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be, for example, tablets, dragees, capsules or suppositories, or in liquid form solutions, suspensions or emulsions. They may be sterilized and/or contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by usual methods.

The following examples illustrate the invention.

EXAMPLE 1

8.25 g. of 1-oxo-3-phenyl-6,7,8,9,10,1-hexahydro-pyrido [1,2-a]pyrazine are dissolved with heating in a mixture of 200 ml. of ethanol and 200 ml. of ethyl acetate. The solution is maintained at 50° C. and hydrogenated in the presence of 500 mg. of palladium carbon (10%) until 875 ml. of hydrogen have been absorbed (for 8½ hours). The catalyst is filtered off, the filtrate evaporated under vacuum and the residue is recrystallized from ethyl acetate+petroleum ether, to yield 1-oxo-3-phenyl-octahydro-pyrido[1,2-a]pyrazine of the formula

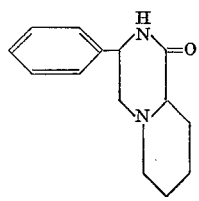

in the form of colourless crystals melting at 146° to 148° C. The hydrochloride, manufactured in the usual manner, melts at 251° to 254° C. with decomposition.

The 1-oxo-3-phenyl-6,7,8,9,10,1-hexahydro-pyrido[1,2-a]pyrazine used as starting material may be manufactured in the following manner: A suspension of 76.8 g. of 2-carbamoylpiperidine and 59.7 g. of ω-bromo-acetophenone in 1500 ml. of benzene is stirred under reflux for 2 hours, then cooled to room temperature and filtered. The solid residue is pasted with water, filtered off and washed with water. On recrystallization from ethanol+petroleum ether, 1-phenacyl-2-carbamoylpiperidine, melting at 165° to 168° C., is obtained.

The toluene solution is filtered, extracted with N-hydrochloric acid, the extract is rendered alkaline with sodium bicarbonate and once more extracted by shaking with methylene chloride. The methylene chloride residue is recrystallized from ethyl acetate and yields 1-oxo-3-hydroxy-3-phenyloctahydro-pyrido[1,2 - a]pyrazine melting at 141°–143° C.

A suspension of 39 g. of 1-phenacyl-2-carbamoylpiperidine and 3.9 g. of para-toluenesulphonic acid in 1500 ml. of toluene is refluxed for 3 hours in a round-bottom flask equipped with water separator and reflux condenser and then evaporated under vacuum. The residue is dissolved in ethanol, a small amount of water and sodium bicarbonate is added, and the whole is treated with animal charcoal and filtered while still hot. The filtrate is mixed with water just until a turbidity as yet fails to appear. On cooling, yellow brown needles separate out which are recrystallized from ethyl acetate+petroleum ether, to yield 1-oxo-3-phenyl-6,7,8,9,10,1-hexahydropyrido[1,2-a]pyrazine melting at 176° to 180° C.

The same product results when instead of 1-phenacyl-2-carbamoylpiperidine the 1-oxo-3-hydroxy - 3 - phenyl-octahydropyrido[1,2-a]pyrazine is treated with para-toluenesulphonic acid in toluene.

On the other hand, 1-oxo-3-phenyl-6,7,8,9,10,1-hexahydro-pyrido[1,2-a]pyrazine is also obtained when a solution of 1-oxo-3-hydroxy-3-phenyl-octahydro-pyrido[1,2-a]pyrazine or of 1-phenacyl - 2 - carbamoylpiperidine, or of a mixture of these two products, in 2N-acetic acid is heated for a short time at the boil, allowed to cool, and the precipitated crystals are filtered off.

EXAMPLE 2

9.1 g. of 1-oxo-3phenyl - octahydro - pyrido[1,2-a] pyrazine are added to a suspension of 3.85 g. of sodium hydride (50%) in 250 ml. of absolute dioxane, and the whole is stirred under reflux for 5 hours. A solution of 10 g. of dimethyl sulphate in 20 ml. of dioxane is then dropped in, and the mixture is further heated for 16 hours, then evaporated under vacuum, the residue is taken up in ethyl acetate, washed with sodium bicarbonate solution and extracted with 2N-hydrochloric acid. The hydrochloric aqueous layer is alkalinized with ammonia and extracted with ethyl acetate. The extract is evaporated and the residue recrystallized from petroleum ether, to yield 1-oxo-2-methyl-3-phenyl - octahydro - pyrido[1,2-a]pyrazine of the formula

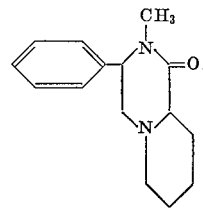

in the form of colourless crystals melting at 84° to 86° C. The hydrochloride is prepared in the usual manner; it melts at 212° to 213° C. with decomposition.

EXAMPLE 3

20. g. of 1-oxo-3-(3′,4′-dimethoxyphenyl)-6,7,8,9,10,1-hexahydro-pyrido[1,2-a]pyrazine are dissolved with heating in a mixture of 600 ml. of ethanol and 100 ml. of ethyl acetate and hydrogenated at 50° C. in the presence of 1 g. of palladium carbon (10%) until the theoretical amount of hydrogen has been absorbed. The catalyst is filtered off and the filtrate evaporated under vacuum; the residue forms an oil which on mixing with ethanolic hydrochloric acid yields the hydrochloride of 1-oxo-3-(3′-4′-dimethoxyphenyl)octahydro - pyrido[1,2-a]pyrazine of the formula

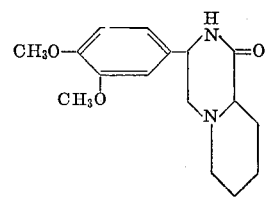

melting at 216° to 217° C.

The 1 - oxo-3-(3′,4′-dimethoxyphenyl) - 6,7,8,9,10,1-hexahydro-pyrido[1,2-a]pyrazine used in this example may be prepared in the following manner:

25.9 g. of ω-bromo-meta, para-dimethoxyacetophenone are added to a suspension of 25.6 g. of 2-carbamoylpiperidine in 800 ml. of benzene and the whole is stirred under reflux for 3 hours, then cooled, mixed with petroleum ether and filtered. The solid residue is taken up in chloroform, the solution is washed with sodium bicarbonate solution, dried over sodium sulphate and evaporated. The solid residue (melting at 170° to 172° C.) is boiled with 1 litre of 0.5 N acetic acid, whereupon at first a solution is obtained from which later on crystals settle out abundantly, which are cooled, filtered off and recrystallized from ethanol. The resulting 1 - oxo-3-(3',4'-dimethoxyphenyl) - 6,7,8,9,10,1 - hexahydro-pyrido[1,2-a]pyrazine melts at 151° to 152° C.

EXAMPLE 4

A solution of 12 g. of 1-oxo-3)4'-methoxyphenyl)-6,7,8,9,10,1-hexahydro-pyrido[1,2-a]pyrazine in 600 ml. of ethanol and 100 ml. of ethyl acetate is hydrogenated at 50° C. in the presence of 0.5 g. of palladium carbon (10%) until the theoretical amount of hydrogen has been absorbed. The catalyst is then filtered off, the filtrate evaporated under vacuum and the residue crystallized from ethanol, to yield 1-oxo-3-(4' - methoxyphenyl)-octahydro-pyrido[1,2-a]pyrazine of the formula

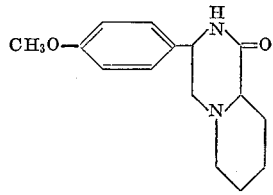

in the form of colourless crystals melting at 172° to 174° C. The hydrochloride melts at 223° to 225° C. with decomposition.

The 1-oxo-3-(4'-methoxyphenyl) - 6,7,8,9,10,1-hexahydropyrido[1,2-a]pyrazine used in the above example may be manufactured as described in Example 3 for the 1-oxo-3-(3',4'-dimethoxy-phenyl) - 6,7,8,9,10,1 - hexahydro-pyrido[1,2-a]pyrazine from ω-bromo-para-methoxyacetophenone and 2-carbamoylpiperidine in toluene; after recrystallization from ethanol it melts at 168° to 170° C.

EXAMPLE 5

A solution of 20 g. of 1-oxo-3-(2',5'-dimethoxyphenyl)-6,7,8,9,10,1-hexahydro - pyrido[1,2-a]pyrazine in 200 ml. of ethanol is hydrogenated at 50° C. in the presence of 1.5 g. of palladium carbon (10%) until the theoretical amount of hydrogen has been consumed. The catalyst is then filtered off, the filtrate evaporated under vacuum and the residue recrystallized from methylene chloride+petroleum ether, to yield 1-oxo-3-(2',5'-dimethoxyphenyl)-octahydro-pyrido[1,2-a]pyrazine of the formula

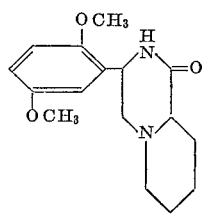

in colourless crystals melting at 180° to 182° C. The hydrochloride melts at 236° to 237° C. with decomposition.

The 1-oxo-3-(2',5' - dimethoxyphenyl)-6,7,8,10,1-hexahydro-pyrido[1,2-a]pyrazine used in this example may be prepared thus:

25.9 g. of ω-bromo-2,5-dimethoxyacetophenone are added to a suspension of 25.6 g. of 2-carbamoylpiperidine in 500 ml. of benzene and the whole is stirred under reflux for 3 hours, then evaporated to vacuum and the residue is taken up in chloroform and water. The chloroform layer is washed with sodium bicarbonate solution and with water, dried over magnesium sulphate and evaporated. The oily residue is mixed with 500 ml. of N-acetic acid and heated for 5 minutes at the boil, whereupon an oil separates out. It is taken up in chloroform, washed with sodium bicarbonate solution and dried over magnesium sulphate, evaporated under vacuum, and the residual oil is hydrogenated as described above as it is.

EXAMPLE 6

A solution of 15.5 g. of 1-oxo-3-(3',4',5'-trimethoxyphenyl)-6,7,8,9,10,1-hexahydro-pyrido[1,2-a]pyrazine in 500 ml. of ethanol and 300 ml. of ethyl acetate is hydrogenated at 50° C. in the presence of 1 g. of palladium carbon (10%) until the theoretical amount of hydrogen has been absorbed; the catalyst is then filtered off, and the filtrate is evaporated. The residue is crystallized from ethyl acetate, to yield 1-oxo-3-(3',4',5'-trimethoxyphenyl)-octahydro-pyrido[1,2-a]pyrazine of the formula

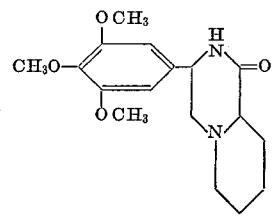

in colourless crystals melting at 179° to 181° C. The hydrochloride, obtained in the usual manner, melts at 272° to 273° C. with decomposition.

The 1-oxo-3-(3',4',5'-trimethoxyphenyl)-6,7,8,9,10,1-hexahydro-pyrido[1,2-a]pyrazine used in this example may be prepared in the following manner:

14.5 g. of ω-bromo-3,4,5-trimethoxyacetophenone are added to a suspension of 13 g. of 2-carbamoylpiperidine in 500 ml. of benzene, and the whole is stirred under reflux for 3 hours and then evaporated under vacuum. The residue is taken up in chloroform and water, the chloroform layer is extracted with sodium bicarbonate solution and water, dried over magnesium sulphate and evaporated. The oily residue is heated for 5 minutes at the boil with 500 ml. of N-acetic acid. After cooling, the crystals which settle out are filtered off and recrystallized from ethanol+ ethyl acetate, to yield 1-oxo-3-(3',4',5'-trimethoxyphenyl)-6,7,8,9,10,1 - hexahydro-pyrido[1,2-a]pyrazine melting at 205° to 207° C.

EXAMPLE 7

16 g. of 1-oxo-3-(para-methylphenyl)-6,7,8,9,10,1-hexahydro-pyrido[1,2-a]pyrazine are dissolved with heating in 250 ml. of ethanol and 250 ml. of ethyl acetate. While maintaining the solution at 50° C. it is hydrogenated in the presence of 1 g. of palladium carbon of 10% strength until 1450 ml. of hydrogen have been consumed (for 4 hours). The catalyst is filtered off, the filtrate evaporated under vacuum and the residue crystallized from ethyl acetate+petroleum ether, to yield 1-oxo-3-(para-methylphenyl)-octahydro-pyrido[1,2-a]pyrazine of the formula

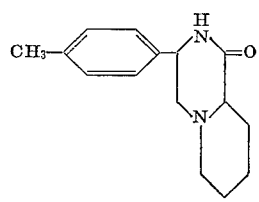

in the form of colourless crystals melting at 156 to 158° C. Its hydrochloride, prepared in the usual manner, melts at 224 to 226° C. with decomposition.

The 1-oxo-3-(para-methylphenyl)-6,7,8,9,10,1-hexahydro-pyrido[1,2-a]pyrazine used as starting material may be prepared thus:

A suspension of 25.6 g. of 2-carbamoylpiperidine and 16.9 g. of ω-bromo-para-methyl-acetophenone in 500 ml. of benzene is stirred and refluxed for 2 hours, then cooled to room temperature and filtered. The benzene solution is extracted with ice-cold N-hydrochloric acid, the hydrochloric aqueous layer rendered alkaline with sodium bicarbonate and extracted with methylenechloride. The oily methylenechloride residue is taken up in 1 litre of 0.5 N-acetic acid and boiled for 10 minutes. The crystals which have settled out are filtered off after cooling, dried and recrystallized from ethyl acetate+ether, to yield 1-oxo-3-(para-methylphenyl)-6,7,8,9,10,1-hexahydro-pyrido[1,2-a]pyrazine melting at 172 to 174° C.

EXAMPLE 8

9 g. of 1-oxo-3-(2′,5′-dimethylphenyl)-6,7,8,9,10,1-hexahydro-pyrido[1,2-a]pyrazine are dissolved with heating in 250 ml. of ethanol and hydrogenated at 50° C. in the presence of 0.5 g. of palladium carbon of 10% strength until the theoretical amount of hydrogen has been consumed. The catalyst is filtered off, the filtrate evaporated under vacuum and there is obtained as residue a solid body which, on recrystallization from ethyl acetate+petroleum ether, yields 1-oxo-3-(2′,5′-dimethylphenyl)-octahydro-pyrido[1,2-a]pyrazine of the formula

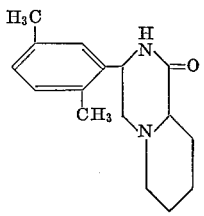

in the form of colourless crystals melting at 186 to 188° C. Its hydrochloride, prepared in the usual manner, melts at 234 to 235° C.

The 1-oxo-3-(2′,5′-dimethylphenyl)-6,7,8,9,10,1-hexahydro-pyrido[1,2-a]pyrazine used as starting material can be prepared thus:

18.3 g. of ω-bromo-2,5-dimethyl-acetophenone are added to a suspension of 25.6 g. of 2-carbamoylpiperidine in 800 ml. of benzene; the whole is stirred and refluxed for 4 hours, then cooled, while being stirred, mixed with ice and 2 N-hydrochloric acid, the hydrochloric layer is separated, rendered alkaline with sodium carbonate solution and extracted with methylenechloride. The oily residue of the dried and evaporated methylenechloride solution is boiled with 500 ml. N-acetic acid, whereupon at first a solution is obtained from which later on copious crystals settle out. The whole is cooled, filtered and recrystallized from ethanol. The resulting 1-oxo-3-(2′,5′-dimethylphenyl)-6,7,8,9,10,1-hexahydropyrido[1,2-a]pyrazine melts at 130 to 132° C.

EXAMPLE 9

A solution of 10 g. of 1-oxo-3-(meta-nitrophenyl)-6,7,8,9,10,1-hexahydro-pyrido[1,2-a]pyrazine in 200 ml. of dimethylformamide is hydrogenated at 32° C. in the presence of 0.5 g. of palladium carbon of 10% strength until 3.25 litres of hydrogen have been consumed. The catalyst is then filtered off, the filtrate evaporated under vacuum, the residue is dissolved in 2N-hydrochloric acid, the solution treated with animal charcoal, the impurity extracted with methylenechloride, the aqueous hydrochloric layer is rendered alkaline with concentrated ammonia and extracted with methylenechloride. The extract is dried, evaporated and the residue crystallized from ethyl acetate, to yield 1-oxo-3-(meta-aminophenyl)-octahydro-pyrido[1,2-a]pyrazine of the formula

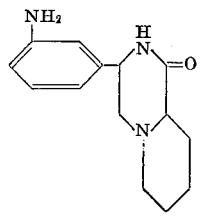

in the form of colourless crystals melting at 190 to 192° C.

The 1-oxo-3-(meta-nitrophenyl)-6,7,8,10,1-hexahydro-pyrido[1,2-a]pyrazine used as starting material may be prepared thus:

30 g. of ω-chloro-meta-nitro-acetophenone are added to a suspension of 38.4 g. of 2-carbamoylpiperidine in 500 ml. of benzene; the whole is stirred and boiled for 3 hours, then cooled, ice and N-hydrochloric acid are added, the aqueous hydrochloric layer is separated and rendered alkaline with sodium carbonate and extracted with methylenechloride. The residue is extracted by being boiling with 1 litre of N-acetic acid. The batch is cooled, the crystals which have setled out are filtered off and recrystallized from methylenechloride+petroleum ether, and there is obtained 1-oxo-3-(meta-nitrophenyl)-6,7,8,9,10,1-hexahydro-pyrido[1,2-a]pyrazine in the form of brown-red crystals melting at 219 to 220° C.

EXAMPLE 10

A solution of 10 g. of 1-oxo-3-(meta-aminophenyl)-octahydro-pyrido[1,2-a]pyrazine and 3.9 g. of pyridine in 200 ml. of absolute dioxane is cooled to 10° C., and a solution of 3.5 g. of acetylchloride in 20 ml. of dioxane is stirred in. The mixture is stirred on for 1 hour at room temperature, mixed with 500 ml. of water, rendered alkaline with sodium bicarbonate solution, cooled in an ice bath, and the settled out crystals are filtered off and recrystallized from methanol, to yield 1-oxo-3-(meta-acetaminophenyl)-octahydro-pyrido[1,2-a]pyrazine of formula

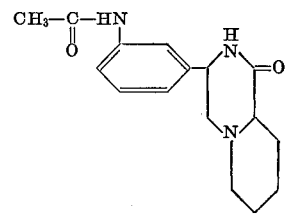

in the form of colourless crystals melting at 255 to 256° C.

A solution of 3 g. of 1-oxo-3-phenyl-octahydro-pyrido[1,2-a]pyrazine in 20 ml. of concentrated sulphuric acid is heated to 50° C., and 5 ml. of nitric acid of 90% strength are stirred in, during which the temperature rises to 60° C. and is maintained at 60° C. for 15 minutes. The batch is then poured over ice and rendered alkaline with concentrated ammonia, whereupon a copious precipitate forms which is suctioned off and washed with water. After repeated recrystallization from ethanol it yields 1-oxo-3-(para-nitrophenyl)-octahydro-pyrido[1,2-a]pyrazine of the formula

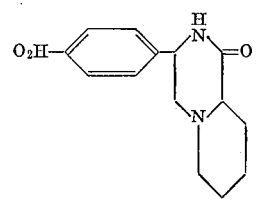

in the form of faintly yellowish crystals melting at 205 to 207° C.

EXAMPLE 12

A solution of 35 ml. of formalin, 4.2 g. of potassium carbonate and 7 g. of 1-oxo-3-phenyl-octahydro-pyrido[1,2-a]pyrazine in 350 ml. of methanol is refluxed for 30 minutes, then evaporated under vacuum. The residue is mixed with water and extracted with methylenechloride. After drying and evaporating, the solid residue is recrystallized from methylenechloride+petroleum ether, to yield 1-oxo-2-(hydroxymethyl)-3-phenyl - octahydropyrido[1,2-a]pyrazine of the formula

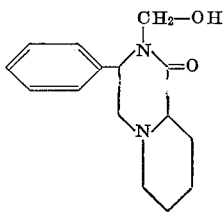

in the form of colourless crystals melting at 131 to 132° C.

EXAMPLE 13

10 g. of 1-oxo-3-phenyl-6-carbamoyl-6,7,8,9,10,1-hexahydro-pyrido[1,2-a]pyrazine are dissolved in 25 ml. of dimethylformamide and hydrogenated in the presence of 1 g. of palladium carbon (10%) at 43° C. until 800 ml. of hydrogen have been consumed (duration: 13 hours). The catalyst is filtered off, the filtrate is evaporated in vacuo and the residue crystallized from ethanol, to yield 1-oxo-3-phenyl-6-carbamoyl - octahydro - pyrido[1,2-a]pyrazine of the formula

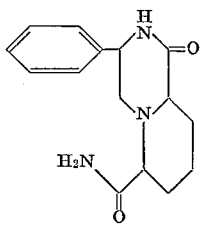

in the form of colourless crystals melting at 283–284° C.

The 1 - oxo - 3-phenyl-6-carbamoyl-6,7,8,9,10,1-hexahydro-pyrido[1,2-a]pyrazine may be prepared as follows:

A solution of 43 g. of 2,6-dicarbamoyl-piperidine, 40 g. of ω-chloro-acetophenone and 25 g. of triethylamine in 500 ml. of absolute ethanol is boiled under reflux for 6 hours with stirring. 30 ml. of glacial acetic acid are then added and the reaction mixture boiled for 1½ hours. The batch is cooled to 40° C. and the precipitated crystals filtered off. After recrystallization from a mixture of dimethylformamide+alcohol+water there is obtained 1-oxo-3-phenyl-6-carbamoyl - 6,7,8,9,10,1-hexahydro-pyrido-[1,2-a]pyrazine melting at 290–292° C.

EXAMPLE 14

Tablets containing 100 mg. of 1-oxo-3-phenyl-octahydro-pyrido[1,2-a]pyrazine hydrochloride can be prepared, for example, with the following ingredients:

| | Per tablet, mg. |
|---|---|
| 1-oxo-3-phenyl-octahydro-pyrido-[1,2-a]pyrazine hydrochloride | 100 |
| Lactose | 50 |
| Wheat starch | 50 |
| Colloidal silicic acid | 13 |
| Arrowroot | 24 |
| Talc | 12 |
| Magnesium stearate | 1 |
| | 250 |

METHOD 1-oxo-3-phenyl - octahydro - pyrido[1,2-a]pyrazine hydrochloride is mixed with the lactose, a part of the wheat starch and with colloidal silicic acid, and the mixture passed through a sieve. The remaining wheat starch is pasted with five times the quantity of water on a waterbath and the powdery mixture kneaded with this paste until a slightly plastic mass is formed. The plastic mass is passed through a sieve having a mesh of about 3 mm, dried and the dry granulate once more passed through a sieve. Arrowroot, talc and magnesium stearate are then mixed in and the resulting mixture compressed to tablets weighing 250 mg.

What is claimed is:

1. A member selected from the group consisting of compounds of the formula

in which X stands for a member selected from the group consisting of lower alkylene providing 3 to 5 ring carbon atoms and carbamoyl-lower alkylene providing 3 to 5 ring carbon atoms, Ph stands for a member selected from the group consisting of phenyl and phenyl substituted by one to three members selected from the group consisting of lower alkyl, lower alkoxy, halogen, trifluoromethyl, methylenedioxy, hydroxy, nitro, amino, mono-lower alkylamino, di-lower alkylamino, lower alkanoylamino and benzoylamino, $R_2$ stands for a member selected from the group consisting of hydrogen and lower alkyl, $R_3$ stands for a member selected from the group consisting of hydrogen, lower alkyl, phenyl, phenyl-lower alkyl, and phenyl and phenyl-lower alkyl substituted in the phenyl portion by one to three members selected from the group consisting of lower alkyl, lower alkoxy, halogen, trifluoromethyl, methylenedioxy, hydroxy, nitro, amino, mono-lower alkylamino, di-lower alkylamino, lower alkanoylamino and benzoylamino and $R_1$ stands for a member selected from the group consisting of hydrogen, lower alkyl, lower alkenyl, hydroxy-lower alkyl, cyclo-lower alkyl, phenyl-lower alkyl, phenyl-lower alkyl substituted by one to three members selected from the group consisting of lower alkyl, lower alkoxy, halogen, trifluoromethyl, methylenedioxy, hydroxy, nitro, amino, mono-lower alkylamino, di-lower alkylamino, lower alkanoylamino and benzoylamino, amino-lower alkyl, lower alkylamino - lower alkyl, di-lower alkylamino - lower alkyl, cyclo-lower alkylamino-lower alkyl in which cyclo-lower alkyl contains 5 to 6 ring members, N-lower alkylcyclolower alkylamino-lower alkyl in which cyclo-lower alkyl contains 5 to 6 ring members, lower alkyleneimino-lower alkyl, morpholino, piperazino, N'-hydroxyethylpiperazino and N'-methylpiperazino, and their pharmaceutically acceptable acid addition salts.

2. A product as claimed in claim 1, wherein X stands for a member selected from the group consisting of tetramethylene, lower alkylated tetramethylene and carbamoyl-tetramethylene, Ph stands for a member selected from the group consisting of phenyl and phenyl substituted by one to three member selected from the group consisting of lower alkyl, lower alkoxy, halogen, nitro, amino and lower alkanoylamino, $R_1$ for a member selected from the group consisting of hydrogen, lower alkyl and hydroxy-lower alkyl, $R_2$ for a member selected from the group consisting of hydrogen and lower alkyl and $R_3$ for hydrogen.

3. A product as claimed in claim 1, wherein X stands for tetramethylene, Ph for a member selected from the group consisting of phenyl and phenyl substituted by one to three members selected from the group consisting of lower alkyl, lower alkoxy and halogen, $R_1$ and $R_2$ each stands for hydrogen or lower alkyl and $R_3$ for hydrogen.

4. A product as claimed in claim 1, which product is the 1-oxo-3-phenyl-octahydro-pyrido[1,2-a]pyrazine or a pharmaceutically acceptable acid addition salt thereof.

5. A product as claimed in claim 1, which product is the 1-oxo - 2 - methyl-3-phenyl-octahydro-pyrido[1,2-a]pyrazine or a pharmaceutically acceptable acid addition salt thereof.

6. A product as claimed in claim 1, which product is the 1-oxo-3-(3′,4′-dimethoxy-phenyl) - octahydro-pyrido[1,2-a]pyrazine or a pharmaceutically acceptable acid addition salt thereof.

7. A product as claimed in claim 1, which product is the 1-oxo - 3 - (4′-methoxy-phenyl)-octahydro-pyrido[1,2-a]pyrazine or a pharmaceutically acceptable acid addition salt thereof.

8. A product as claimed in claim 1, which product is the 1-oxo-3-(2′,5′-dimethoxy-phenyl)-octahydro-pyrida[1,2-a]pyrazine or a pharmaceutically acceptable acid addition salt thereof.

9. A product as claimed in claim 1, which product is the 1-oxo - 3 - (3′,4′,5′-trimethoxy-phenyl)-octahydro-pyrido[1,2-a]pyrazine or a pharmaceutically acceptable acid addition salt thereof.

10. A product as claimed in claim 1, which product is the 1-oxo-3-(para - methyl - phenyl)-octahydro-pyrido[1,2-a]pyrazine or a pharmaceutically acceptable acid addition salt thereof.

11. A product as claimed in claim 1, which product is the 1-oxo-3-(2′,5′-dimethyl-phenyl)-octahydro-pyrido[1,2-a]pyrazine or a pharmaceutically acceptable acid addition salt thereof.

12. A product as claimed in claim 1, which product is the 1-oxo-3-(meta - amino - phenyl)-octahydro-pyrido[1,2-a]pyrazine or a pharmaceutically acceptable acid addition salt thereof.

13. A product as claimed in claim 1, which product is the 1-oxo-3-(meta-acetamino-phenyl)-octahydro-pyrido[1,2-a]pyrazine or a pharmaceutically acceptable acid addition salt thereof.

14. A product as claimed in clim 1, which product is the 1 - oxo-3-(para-nitrophenyl)-octahydro-pyrido[1,2-a]pyrazine or a pharmaceutically acceptable acid addition salt thereof.

15. A product as claimed in claim 1, which product is the 1 - oxo-2 - (hydroxymethyl)-3-phenyl-octahydro-pyrido[1,2-a]pyrazine or a pharmaceutically acceptable acid addition salt thereof.

16. A product as climed in claim 1, which product is the 1 - oxo - 3-phenyl-6-carbamoyl-octahydro-pyrido-[1,2-a]pyrazine or a pharmaceutically acceptable acid addition salt thereof.

References Cited

FOREIGN PATENTS 1,510,781   2/1967   France.

ALEX MAZEL, Primary Examiner

A. M. TIGHE, Assistant Examiner

U.S. Cl. X.R.

260—239.65, 247.1, 247.2; 424—200, 229, 232, 248, 250